(12) United States Patent
Högl, deceased et al.

(10) Patent No.: US 6,589,425 B1
(45) Date of Patent: Jul. 8, 2003

(54) METHOD FOR TREATING PROCESS WASTE WATERS HIGHLY CHARGED WITH AMMONIUM IN WASTE WATER SYSTEMS

(75) Inventors: Maximilian Högl, deceased, late of Landshut (DE); by Undine Gabriele Högl, legal representative, Karlsfeld (DE); by Christian Eric Högl, legal representative, Münich (DE); by Cindy Diana Högl, legal representative, Rehlingen (DE)

(73) Assignee: Sud-Chemie AG, Munich (DE)

( * ) Notice: Subject to any disclaimer, the term of this patent is extended or adjusted under 35 U.S.C. 154(b) by 0 days.

(21) Appl. No.: 09/530,621

(22) PCT Filed: Oct. 30, 1998

(86) PCT No.: PCT/EP98/06882

§ 371 (c)(1),
(2), (4) Date: Jul. 3, 2000

(87) PCT Pub. No.: WO99/23039

PCT Pub. Date: May 14, 1999

(30) Foreign Application Priority Data

Oct. 30, 1997 (DE) .......................... 197 48 000
Jun. 24, 1998 (DE) .......................... 198 28 175

(51) Int. Cl.[7] ................ C02F 3/30; C02F 3/08
(52) U.S. Cl. ............. 210/605; 210/616; 210/631; 210/903
(58) Field of Search ................ 210/605, 612, 210/615–617, 620, 630, 631, 903, 150, 151; 435/176, 177

(56) References Cited

U.S. PATENT DOCUMENTS

| | | | | |
|---|---|---|---|---|
| 3,876,536 A | * | 4/1975 | Pradt et al. | 210/609 |
| 4,225,430 A | * | 9/1980 | Bosman | 210/610 |
| 4,290,895 A | * | 9/1981 | Iwamoto | 210/669 |
| 4,576,718 A | * | 3/1986 | Reischl et al. | 210/616 |
| 4,626,354 A | * | 12/1986 | Hoffman et al. | 210/603 |
| 4,715,958 A | * | 12/1987 | Fuchs | 210/605 |
| 5,022,993 A | * | 6/1991 | Williamson | 210/605 |
| 5,228,997 A | * | 7/1993 | Martin et al. | 210/610 |
| 5,286,385 A | * | 2/1994 | Jorgensen et al. | 210/610 |
| 5,518,910 A | * | 5/1996 | Parker et al. | 435/176 |
| 5,580,770 A | * | 12/1996 | DeFilippi | 435/180 |

FOREIGN PATENT DOCUMENTS

| | | | |
|---|---|---|---|
| DE | 3724027 A1 | * | 2/1989 |
| DE | 4133954 A1 | * | 4/1993 |
| DE | 19631796 A1 | * | 2/1998 |
| EP | 0383674 A1 | * | 2/1990 |
| JP | 7-68286 | * | 3/1995 |
| JP | 8-71592 | * | 3/1996 |

* cited by examiner

*Primary Examiner*—Fred Prince
(74) *Attorney, Agent, or Firm*—Scott R. Cox

(57) ABSTRACT

A process for treating industrial waste water highly loaded with ammonium, by treating the waste water with nitrifying microorganisms (nitric bacteria) in the presence of a suspended carrier substance with a specific surface of $>20$ $m^2/g$ and in a given case a denitrification with denitrifying microorganisms (denitrifying bacteria). According to a modification of the process, a finely-divide carbon-containing material with a surface-pH value of around 6 to 9 is used instead of the silicate carrier substance.

27 Claims, No Drawings

METHOD FOR TREATING PROCESS WASTE WATERS HIGHLY CHARGED WITH AMMONIUM IN WASTE WATER SYSTEMS

BRIEF SUMMARY OF THE INVENTION

The invention concerns a process for treating industrial waste waters highly loaded with ammonium. In accordance with the invention "ammonium" is understood as meaning both ammonium compounds as well as ammonia

BACKGROUND OF THE INVENTION

Waste water loaded with ammonium, including highly loaded industrial waste water, can be purified in different ways. In the case of physical purification, the pH value is increased by the addition of lye, whereupon ammonia is removed by stripping with steam or with a gas and recovered by condensation. The profit from the recovered ammonia is very small in comparison with the high investment costs, and, in addition, waste waters can only be purified if they contain less than 100 mg $NH_4$-nitrogen ($NH_4$—N) per liter in this way.

A chemical process for removal is based on the precipitation of magnesium ammonium phosphate. In this case magnesium salts and phosphates are added to the waste water, magnesium ammonium phosphate precipitates out at a specific pH value. The magnesium ammonium phosphate can be reprocessed by heating, producing magnesium hydrogen phosphate and ammonia, which can be removed by stripping. The magnesium hydrogen phosphate then can be added to the waste water again as a precipitation agent. However, this process is very cost-intensive.

A further, more economical, biological process includes treating of the waste water with nitrifying microorganisms (nitric bacteria), the nitric bacteria being colonized on a solid carrier bed. The waste water is aerated, the nitric bacteria oxidizes the ammonium nitrogen to nitrite (Nitrosomonas) or to nitrate (Nitrobacter).

Formerly the solid carrier bed for this process in general contained lava, while more recently, in general, plastic bars, balls, or fibers have been used. These materials create a colonization surface for the nitric bacteria.

A three-stage fluidized bed reactor, in which the biomass is colonized on a carrier substance (basalt), is presented in article No 20 by J. Mihopulos, "Cost-reducing Strategies for Water Treatment Plants: Separate Turbid Water Treatment" in the book "Stickstoffrüickbelastung—Stand der Technik 1996/1997—Zukünftige Entwicklungen" by J. St. Kollbach and M. Grömping, T K-Verlag Karl Thomé-Kozmiensky. This substance is held In suspension with recirculation. However, the carrier substance is fairly large-grained. In addition, its specific surface is below 10 $m^2/g$. If the aeration stops, the carrier substance is precipitated, thus leading to blockage and death of the biofilm.

A process for nitrogen removal in water treatment plants with a biological treatment stage, partial flows of the sludge treatment highly loaded with ammonium being used for growing nitric bacteria, is known from "Korrespondenz Abwasser", 12, 1994, p. 2261–2268. The active biomass obtained is used for promoting the nitrification in the subsequent purification stages. The use of nitric bacteria In the presence of aluminum and iron hydroxides is supposed to lead to a significant elimination of nitrogen in the treated waste water during the nitrification phase. Also, a considerable amount (67%) of the nitrogen loading already should be removed from the partial flows used for growing the nitric bacteria. In addition, the metal hydroxides loaded with nitric bacteria are removed with the sludge and can lead to environmental pollution as they easily release the corresponding trivalent cations.

DETAILED DESCRIPTION OF THE INVENTION

The invention is based on the problem of treating industrial waste waters highly loaded with ammonium with the use of carrier substances, which make proper operation of the nitric bacteria possible with low investment and operating costs and largely prevent release of multivalent cations from the separated sludge.

Thus, one object of the invention concerns a process for treating industrial waste water highly loaded with ammonium in the waste water field by treating the waste waters with nitrifying microorganisms (nitric bacteria) In the presence of a suspended carrier substance, which is characterized by the fact that a silicate carrier substance with a specific surface area of >20 preferably >50 $m^2g$, is added to the waste waters and suspended therein, and the nitrifying waste waters are optionally subjected to a denitrification with denitrifying microorganism (denitrifying bacteria).

The specific surface area is determined according to the BET method (one-point method with nitrogen according to DIN 66 131).

Preferably a natural silicate carrier substance with a particle size wherein 95% by weight <150 $\mu m$ is used. In this way it is assured that the carrier substance also remains in suspension without expensive stirring devices. Natural silicate carrier substances, as opposed to synthetic carrier substances, are less Inclined to release hazardous substances as they have been subjected to a natural leaching process over geological time. Thus they are more environmentally compatible than synthetic silicate carrier substances.

The silicate carrier substance in accordance with the invention offers a high colonization surface for the nitric bacteria. The high colonization surface makes it possible to treat waste water with high $NH_4$ concentrations, which can no longer be treated according to the known biological process. Preferably industrial waste water with an $NH_4$—N content of about 200 to 2000 mg/liter, in particular with about 400 to 1600 mg/liter, is used.

The silicate carrier substance in general is used in amounts of about 5 to 50 g/liter. Also it Is Important that the specific weight of the carder substances is over 1.5 $g/cm^3$, so that the carrier substance does not float during aeration.

Preferably the silicate carrier substance has a surface pH value of about 6–9. This is determined by stirring a 10% by weight suspension of the silicate carrier substance in water for 15 minutes. The pH value is determined in the filtered solution by means of a glass electrode. Surprisingly it was found that a silicate carrier substance with a surface pH value outside of the indicated range has a low colonization density for the nitric bacteria, and that the colonization density also is not increased significantly, if a pH value within the indicated range is set by the addition of acid or lye in the suspension of the silicate carrier substance.

Preferably the silicate carrier substance has a cation exchange capacity (IEC) of around 40 to 100 meq./100 g, in particular 50 to 80 meq/100 g. The cation exchange capacity is determined as follows:

The dried silicate carrier substance is reacted with a large excess of aqueous $NH_4Cl$ solution. After a standing time of 16 hours at room temperature it is filtered, the filter cake is washed, dried, and ground, and the $NH_4$ content in the carrier substance is determined according to the Kjeldahl method.

In addition, the silicate carrier substance preferably also is hydrophilic, that is, it should have a swelling volume of around 5 to 80 ml/2 g, preferably of around 10 to 20 ml/2 g. The swelling volume is determined as follows:

A calibrated 100 ml measuring cylinder is filled with 100 ml of distilled water. 2.0 g of the substance to be measured are added slowly to the water surface in portions of 0.1 to 0.2 g. After the material sinks, the next portion is added.

After the end of the addition one waits for one hour and then reads the volume of the swollen substance in ml/2 g.

Because of the relatively small particle size and the swelling capacity it is assured that the carrier substance remains suspended homogeneously. If the mixture of waste water and silicate carrier substance tends to foam, antifoaming agent can be added.

Preferably clay minerals, in particular smectitic clay minerals, such as bentonite, vermiculite, chlorite, beidellite, hectorite, nontronite, and illite, are used as the silicate carrier substances. Bentonite (main mineral montmorillonite), which in addition to its function as a colonization surface also adsorbs ammonia and $NH_4+$(in the latter case on the basis of the ion exchange capacity), is particularly preferred as the smectitic clay material.

Other usable silicate carrier substances are, among others, kaolin and serpentine minerals (such as kaolinite, dickite, nacrite, halloysite, antigorite), palygorskite, sepiolite, pyrophyllite, talcum, and zeolites.

The silicate carrier substance can be used in amounts of around 10 to 30 g/liter, preferably 15 g/liter. When less than 10 g/liter is used, not all of the $NH_4$ nitrogen is decomposed. On the other hand, when more than 30 g/liter is utilized, no significant advantage can be determined any longer.

According to a modification of the aforesaid process, the object of the invention is achieved by using a carbon-containing material instead of the silicate carrier substance. Here also the optimal growth and proper operation of the nitric bacteria is ensured by providing a suitable surface with a suitable surface pH value between 6 and 9.

The surface pH value preferably amounts to 6.5 to 8, and, if the material does not have this surface pH value originally, can be maintained, for example, by bringing an initially basic carbon-containing material in contact with an acid waste water.

In particular, active charcoal, lignite coke, coke dust, anthracite, graphite, and/or carbon black are used as carbon-containing material. The materials preferably used all have a high specific surface area of >20 $m^2$/g, preferably from 30 to 50 $m^2$/g. It is assumed that the large specific surface area has a positive effect on the growth and the proper operation of the nitric bacteria, in particular as a result of adsorption or desorption of specific metabolic products.

Preferably a carbon-containing material with a particle size wherein 95% by weight <400 $\mu$m is used. This range is somewhat greater than that In the case of using silicate carrier material, which is made possible by the fact that the carbon-containing materials are specifically lighter that silicate carrier materials and therefore do not precipitate as rapidly. Usually carbon blacks have a particle size of 5 to 500 nm. The particle sizes of graphite and anthracite also lie in the nanometer range.

The carbon-containing carrier substance can be used in amounts of about 10 to 30 g/l, preferably 15 g/l. In the case of less than 10 g/l not all of the $NH_4$ nitrogen is decomposed. On the other hand, in the case of more than 30 g/l no significant advantage can be determined.

It is advantageous that in the case of the use of the above-mentioned carbon-containing materials, no ash residues are formed at the time of burning the sewage sludge originating from the waste water treatment As mentioned above, a surface pH value of the carbon-containing carrier materials of 6 to 9, in particular 6 to 8.5 is preferred. In the case of using anthracite and/or graphite, which are pH-neutral, therefore no treatment has to be made in order to set the desired surface pH value. Of course, activated charcoal and lignite coke as well as coal dust are basic, and therefore are brought to the desired surface pH value by (pre-) treatment with acid. This can take place either by the addition of acid or acid solutions, or by pretreatment with an acid waster water.

The process in accordance with the invention is carried out with ammonia and ammonium-containing industrial waste waters. Therefore the process in accordance with the invention Is not used within the framework of a normal biological purification stage; rather it is a decentralized process for treating highly loaded waste waters.

Preferably partial flows from the sludge treatment and/or supernatant water (turbid water) from the sludge digestion and/or waste dump leakage water are used. The pH value drops as a result of the formation of nitrous acid, or nitric acid, and the reaction comes to a stop. Therefore preferably the pH value is adjusted to about 6.5 to 8.5, in particular to about 6.8 to 7.2, at the time of the nitrification as a result of the addition of alkali. If no pH regulation is carried out, the nitrification efficiency is only about 40 to 60%. No reaction takes place any more below a pH value of 5.9. The nitrification efficiency is increased to over 90% by means of the addition of alkali. In the case of a pH value of more than 9 the reaction also comes to a stop.

In order to achieve a rapid colonization of the carrier substance with the nitric bacteria, a suspension of the carrier substances preliminarily impregnated with the nitric bacteria Is added to the waste waters, bacteria which oxidize the ammonia to nitrite preferably being used as the nitric bacteria. To a smaller degree microorganisms which oxidize the ammonia to nitrate also are used.

By means of the process In accordance with the invention a nitrogen reloading can be avoided after the final denitrification with denitrifying microorganisms (denitrifying bacteria).

The denitrification takes place under aerobic conditions, preferably by supplying an oxygen-containing gas to the waste waters. In general the oxygen concentration should amount to at least 2 mg/liter. Below this concentration the nitrification efficiency decreases.

The nitrified waste water cannot be introduced into the main canal directly because of the high nitrite content. Therefore in general it is necessary to add a denitrification at the outlet side, which can take place in an existing plant. The nitric bacteria absorb the oxygen from the waste water, until the latter becomes anoxic; then it absorbs the oxygen from the nitrite, or from the nitrate, elementary nitrogen being released.

It was found that the nitrification can be optimized, If It carried out with a volumetric loading of about 0,5 to 2,5, preferably 1.9 to 1.5 kg $NH_4$—N/$m^3$ waste water per day. The process also can be carried out in the case of somewhat smaller volumetric loads, if, for example, the $NH_4$—N content decreases in a sequence of operating variations.

This high volumetric loading makes it possible to carry out the process in a relatively small activation basin, by means of which the process can be fundamentally distinguished from the processes which are used in a normal biological purification stage.

Further, it has been found that in the case of waste water with a high organic carbon load, specified as chemical oxygen demand (COD), the carbon load decreases before the nitrification stage to about 300 to 1000, preferably to about 300 to 500 mg/liter. In the case of a high carbon load, the growth of the C-decomposing microorganisms (that is, the heterotrophic bacteria) is promoted, while the growth of the nitric bacteria is suppressed or slowed, by which the nitrification efficiency is reduced.

The reduction of the organic carbon load can take place according to known processes, for example by means of the addition of flocculation agents, such as a solution of salts of multivalent metals, e.g. of iron and aluminum salts. Those salts can be added to the waste water in an amount in the range of about 0.5 g/liter. In this case the colloidal carbon-containing compounds flocculate out and can be separated easily.

Furthermore the organic carbon load can be reduced by a preliminary biological purification with sludge separation, the separated sludge being passed into a digestion tower.

Further the organic carbon load can be reduced oxidatively, e.g. by treatment with ozone. In particular, this process is used in the case of dissolved carbon compounds. Further, the dissolved carbon compounds also can be removed by adsorption. This also applies to carbon compounds with substituents which can impair the subsequent nitrification, e.g. phenols and halogenated hydrocarbons.

Furthermore, experiments were made concerning the optimization of the $NH_4$ nitrogen content. In this case it was found that the $NH_4$ nitrogen content should be limited to a maximum value of about 1200, preferably about 700 mg/liter, before the nitrification. With these $NH_4$ nitrogen contents the nitric bacteria find ideal growth conditions. The $NH_4$ nitrogen content can be obtained e.g. by diluting the waste water with clarified waste water.

The improvements described above (volumetric loading, removal of the carbon load, and limitation of the $NH_4$ nitrogen content) can be made individually or in combination.

The invention is illustrated by the following examples.

EXAMPLES

Example 1

A partial flow from the sludge treatment (200 m³/d; filtrate from a chamber filter press with lime conditioning) with an $NH_4$—N content of 1040 mg/liter, a pH value of 12.5 and a COD value of 400 mg/liter was treated with 2400 kg calcium bentonite from Moosburg (Terrana®, trade name of Süd-Chemie AG) (specific surface area 60 m²/g, particle size 95% by weight <150 µm, cation exchange capacity 63 meq./100 g, swelling volume 12 ml/2 g, surface pH value 8.0). The bentonite was suspended in water (15 g/liter) and impregnated with nitric bacteria from activated sludge before the mixing with the waste water. The bentonite thus treated preliminarily was suspended in the waste water to be treated, and air was blown into the mixture of waste water and bentonite. In this case the pH value dropped gradually The pH value was adjusted to 7.0±0.2 by adding sodium hydroxide solution via a pH-controlled dosing unit. After 4 days at a temperature of about 20° C. the $NH_4$—N content was lowered to about 82 mg/liter (nitrification capacity about 92%). The nitrite N content amounted to about 815 mg/liter, the nitrate N content amounted to about 93 mg/liter. A so-called volumetric loading of about 1.3 kg $NH_4$—N per m³ of waste water per day results from the following equation $$\frac{1.04 \times 200 \text{ kg}}{160 \text{ m}^3 \times d}$$

from the $NH_4$—N content, the basin volume, and the amount of partial flow passed through the activation basin per day.

The waste water thus treated then was denitrified in a denitrification stage (100 m³) connected before the biological stage of an existing unit with external carbon dosing, whereby the nitrite/nitrate nitrogen content was reduced to <1 mg/liter.

Example 2

Example 1 was repeated with the difference that the partial flow from the sludge treatment with a COD of 1200 mg/liter was treated with 0.5 g per liter of a mixture of iron and aluminum chlorides in dissolved form (Südflock K27; trade name of Süd-Chemie AG) in a preliminary sedimentation tank. The material flocculated was separated by settling, and the sludge was passed into a digestion tower. The supernatant, which had a COD value of 500 mg/liter, was passed into the activation basin of Example 1 and further treated as described in this example.

Example 3

Example 1 was repeated with the difference that the $NH_4$—N concentration amounted to 980 mg/liter and anthracite was used as carrier material (specific surface area about 30–40 meg, particle size: 95% by weight <200 µm, surface pH value=7.8).

The anthracite was suspended in water (15 g/l) and impregnated with nitric bacteria from activated sludge before mixing with the waste water. The anthracite thus pretreated was suspended in the waste water to be treated, and air was blown into the mixture of waste water and anthracite. In this case the pH value dropped gradually. The pH value was set to 7.0±0.2 by the addition of sodium hydroxide solution via a pH-controlled dosing unit.

After four days at a temperature of about 20° C. the $NH_4$content was lowered to about 87 mg/liter (nitrification efficiency about 91%). The nitrite N content amounted to about 830 mg/liter, the nitrate N content to about 89 mg/liter. A so-called volumetric loading of about 1.2 kg $NH_4$—N per m³ of waste water per day results from the following equation $$\frac{0.98 \times 200 \text{ kg}}{160 \text{ m}^3 \times d}$$

from the $NH_4$—N content, the basin volume, and the partial flow amounts passed through the activation basin per day.

The waste water thus treated then was denitrified in a denitrification stage (100 m³) connected before the biological stage of an existing unit with external carbon dosing, whereby the nitrite/nitrate nitrogen content was reduced to <1 mg/liter.

SUMMARY

A process for treating industrial waste water highly loaded with ammonium, by treating the waste water with nitrifying microorganisms (nitric bacteria) in the presence of a suspended carrier substance with a specific surface of >20 m²/g and in a given case a denitrification with denitrifying microorganisms (denitrifying bacteria). According to a modification of the process, a finely-divide carbon-containing material with a surface-pH value of around 6 to 9 is used instead of the silicate carrier substance.

What is claimed is:

1. A process for treating industrial waste water which is highly loaded with ammonium at a level of at least about 200 mg/liter comprising treating the waste water with nitrifying microorganisms in the presence of suspended silicate carrier substance, wherein the silicate carrier substance has a specific surface area greater than about 20 m²/g, wherein the silicate carrier substance has a swelling volume of about 5 to about 80 ml/2 g, wherein the carrier substance acts as a carrier for the nitrifying microorganisms and wherein the silicate carrier substance with the nitrifying microorganisms is suspended in the waste water.

2. The process of claim 1, wherein the specific surface area of the carrier substance is greater than about 50 m²/g.

3. The process of claim 1, wherein at least 95 percent of the silicate carrier substance has a particle size less than about 150 μm.

4. The process of claim 1, wherein the industrial waste water has an ammonium/nitrogen content of about 200 to 2000 mg/liter.

5. The process of claim 1, wherein the industrial waste water has an ammonium/nitrogen content of about 400 to 1600 mg/liter.

6. The process of claim 1, wherein a source of the waste water is selected from the group consisting of flow from a sludge treatment plant, supernatant water from sludge digestion and waste dump leakage water.

7. The process of claim 1, further comprising impregnating the silicate carrier substance with the nitrifying microorganisms prior to its addition to the waste water.

8. The process of claim 7, wherein a source for the nitrifying microorganisms comprises a carbon-based product.

9. The process according to claim 1, wherein a denitrifying process is carried out under anoxic conditions.

10. The process of claim 1, wherein the silicate carrier substance comprises about 5 to 50 grams per liter of the waste water.

11. The process according to claim 1, wherein the silicate carrier substance has a surface pH of about 6 to 9.

12. The process of claim 1, wherein the silicate carrier substance comprises a clay mineral.

13. The process of claim 12, wherein the clay mineral comprises a smectite clay.

14. The process of claim 12, wherein the clay mineral comprises a bentonite clay.

15. The process of claim 1, wherein during treatment with the nitrifying microorganisms, the pH value of the waste water is adjusted to about 6.5 to about 8.5 by the addition of an alkali material.

16. The process of claim 1, wherein the amount of the silicate carrier substance added to the waste water is from about 6 to about 15 kg per kg of nitrogen in the waste water.

17. The process of claim 1, wherein notrification is carried out under aerobic conditions.

18. The process claim 1, further comprising nitrifying the waste water by introducing an oxygen-containing gas to the waste water.

19. The process of claim 18, wherein the oxygen content of the waste water is adjusted to be at least about 2 mg per liter of waste water.

20. The process of claim 1, further comprising adjusting the nitrogen content of the waste water to a volumetric loading of about 0.5 to about 2.5 kg of ammonium nitrogen per m³ waste water.

21. The process of claim 1, further comprising reducing the Chemical Oxygen Demand level from at least about 300 to about 100 mg/liter before nitrification.

22. The process of claim 1, wherein the $NH_4$/nitrogen content is limited to a maximum value of about 1200 mg/liter before nitrification.

23. The process of claim 1, wherein the nitrifying microorganisms comprise ammonium-oxidizing bacteria.

24. The process of claim 1, wherein the silicate carrier substance has a cation exchange capacity (CEC) of about 40 to 100 mVal/100 g.

25. The process of claim 1, wherein the silicate carrier substance has a cation exchange capacity (CEC). of about 50 to 80 mVal/100 g.

26. The process of claim 1, wherein the swelling volume of the silicate carrier substance is from about 10 to about 20 ml/2 g.

27. The process of claim 1, further comprising denitrifying the waste water with denitrifying microorganisms.

* * * * *